Patented Nov. 16, 1926.

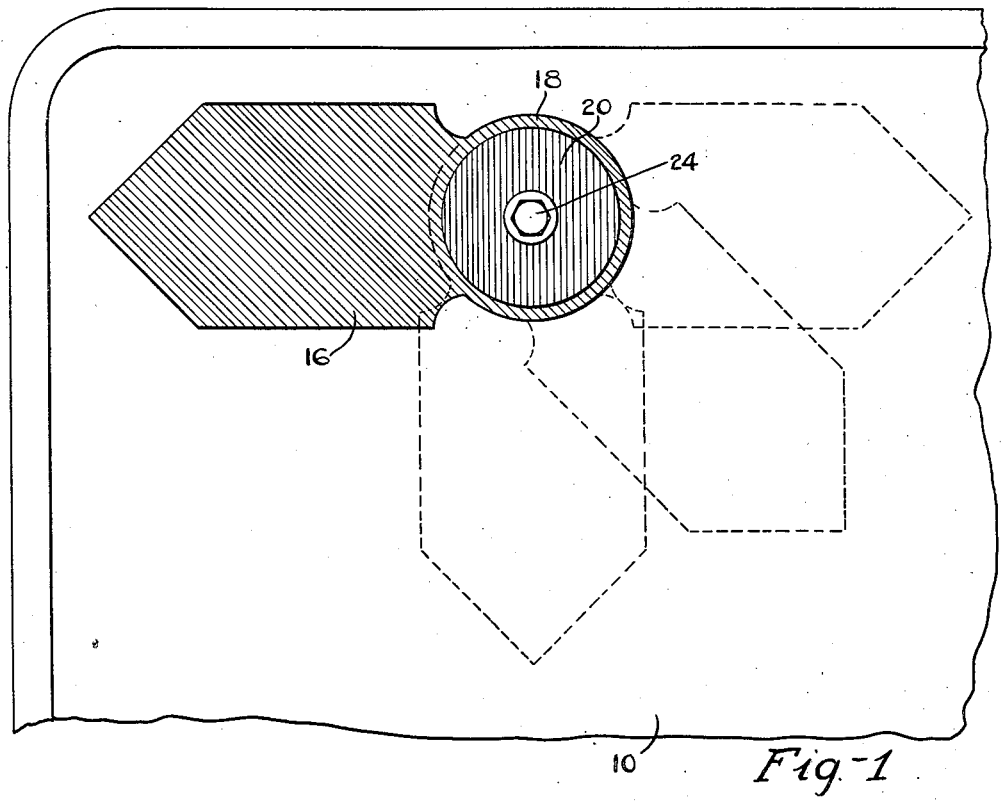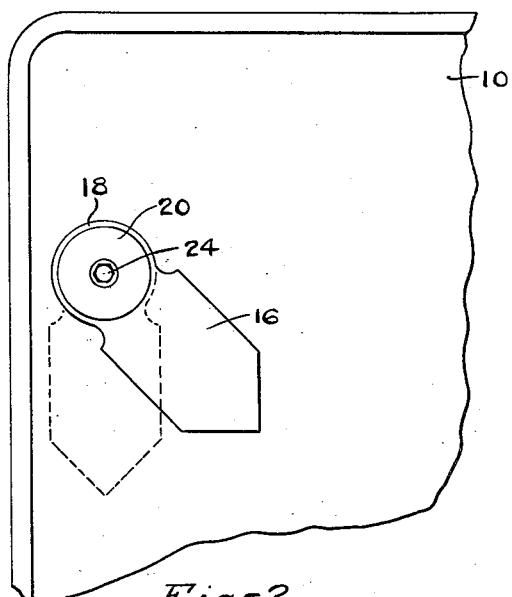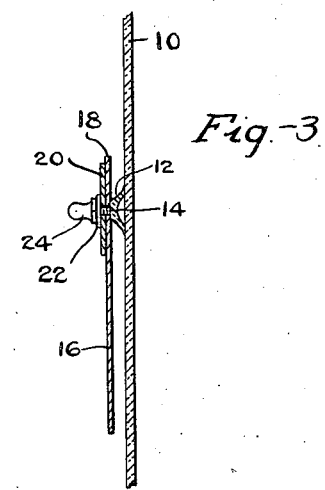

1,606,853

UNITED STATES PATENT OFFICE.

CHARLES H. TRISLER, OF MINNEAPOLIS, MINNESOTA.

GLARE SHIELD.

Application filed November 12, 1924. Serial No. 749,411.

My invention relates to adjustable glare shields. An object is to provide a glare shield which can be quickly applied to the windshield of any automobile or other self propelled vehicle. Another object is to provide a glare shield which can be quickly adjusted in position to suit the requirements of any driver. Another object is to provide a glare shield which during night driving can be so placed on the wind shield that when no protection is required, the obstruction to clear vision is reduced to a minimum but which can be instantly turned into position for fullest possible protection when glaring head lights are approaching and when the head lights have passed, a touch of the finger will return the glare shield to the position of minimum obstruction to clear vision. Another object is to provide a glare shield which, during daytime driving toward the rising or setting sun, can be placed in position on the windshield to protect from direct glare of the sun and which can be instantly shifted and adjusted to other positions to provide fullest protection as the road turns and changes the point at which the sun glare strikes the windshield. Another object is to provide a glare shield which, during daytime driving, when no protection is required, can be removed to the lower, right-hand corner of the wind shield so as to leave the wind shield clear and the vision entirely unobstructed. Another object is to provide a device of this character which is so shaped and so adjustable as to provide instant and maximum protection from the glare of approaching headlights, glare of the sun, or glare of the road or pavement and yet offer the minimum of obstruction to clear vision and which accomplishes its purpose by making possible an instant adjustment that will kill the glare and yet permit the driver to see the road at the side of the glare shield. Another object is to provide a device of this character whose shape and method of attachment permits its use when driving against rain or snow without interfering with the operation of the wind shield wiper. Another object is to provide in combination with a glare shield, a separate and contrasting piece of celluloid, paper or metal of suitable shape for carrying a printed or embossed advertisement, club emblem or any desired reading or pictorial matter.

The full objects and advantages of my invention will appear in connection with the detailed description thereof and the novel features embodied in my inventive idea will be particularly pointed out in the claim.

In the accompanying drawings which illustrate one form in which my invention may be embodied: Fig. 1 is a fragmentary rear view of a windshield showing my glare protector applied thereto for use in daytime driving. Fig. 2 is a view similar to Fig. 1 but showing the glare protector in a different position for use in night driving. Fig. 3 is a view in vertical section In the drawing, the numeral 10 designates a customary windshield in connection with which the glare shield is used. As best shown in Fig. 3 I provide a rubber suction cup 12 to which is secured a rearwardly extending threaded metal shank 14. 16 indicates the main portion of the protector member which is made of colored celluloid or similar translucent material. Celluloid colored green is preferably employed as indicated in Fig. 1. In the embodiment shown, the main portion is arrow-shaped and is provided with a circular head 18 having a central hole therein, which receives the shank 14. A separate disk 20 is provided and this disk as indicated in Fig. 1 is preferably made of celluloid colored red and is somewhat smaller than the head 18. The disk 20 contains a central hole so that it can be superimposed upon the head 18. The threaded shank 14 then extends centrally through the head 18 and the disk 20 and is provided with a washer 22 and an internally threaded screw cap 24 by means of which the main portion of the glare shield is held adjustably in place.

The operation and advantages of my invention will now be obvious. The glare shield is firmly attached to the windshield in any desired position by pressing the suction cup upon the rear surface of the windshield. The screw cap 24 is turned down sufficiently to hold the shield in any desired position but not sufficiently hard to prevent the driver rotating it on shank 14 into any desired adjusted position. For day time driving, in order to obtain protection from the glare of the sun, the suction cup is preferably attached near the upper margin of the wind shield so that the protector member may be turned into various positions, some of which are shown in Fig. 1 as the road turns and changes the point at which the sun glare strikes the wind shield. For night driving in order to obtain protection from the glare of head lights of other vehicles, the suction cup is preferably attached to the windshield lower down and further toward the left, as will be apparent from Fig. 2. When the protector member is in the position shown in full lines in this latter figure, with the lower edge of the arrow-point extending substantially horizontal, the eyes of the driver will be protected from the glare of approaching head lights and at the same time the driver can see past the margin of the protector member and have a clear vision of the edge of the road. When no glaring lights are within the vision of the driver, the protector member may be turned downwardly as indicated by dotted lines in Fig. 2.

I claim:

A device of the class described comprising a protector member of translucent sheet material having a circular head provided with a central hole and an extension which projects from said head, said extension having opposite parallel straight-line edges from whose outer ends the edges of the extension converge upon equal straight-lines so as to meet in a point radially related to said central hole, a rubber suction cup, a shank extending rearwardly from said cup through said hole, and an adjustable securing device on the rear end of said shank.

In testimony whereof I hereunto affix my signature.

CHARLES H. TRISLER.